(12) United States Patent
Chen et al.

(10) Patent No.: US 8,140,643 B2
(45) Date of Patent: Mar. 20, 2012

(54) MANAGING USER PERSONAL INFORMATION ACROSS WEB SITES

(75) Inventors: Jiayue Chen, Austin, TX (US); Matthew Paul Duggan, Austin, TX (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/164,406

(22) Filed: Jun. 30, 2008

(65) Prior Publication Data

US 2009/0327397 A1 Dec. 31, 2009

(51) Int. Cl.
*G06F 15/16* (2006.01)
(52) U.S. Cl. ........................................ 709/218
(58) Field of Classification Search .................... 709/218
See application file for complete search history.

(56) References Cited

U.S. PATENT DOCUMENTS

| | | | |
|---|---|---|---|
| 2002/0083058 A1* | 6/2002 | Hsiao et al. | 707/9 |
| 2002/0128925 A1* | 9/2002 | Angeles | 705/26 |
| 2004/0250141 A1* | 12/2004 | Casco-Arias et al. | 713/202 |
| 2005/0027713 A1* | 2/2005 | Cameron et al. | 707/100 |
| 2005/0132232 A1* | 6/2005 | Sima | 713/201 |
| 2008/0082989 A1* | 4/2008 | Walker | 719/314 |
| 2008/0263644 A1* | 10/2008 | Grinstein | 726/6 |

OTHER PUBLICATIONS

LoginKing Password Manager, SecureWork, Inc., 2003-2006.*

* cited by examiner

*Primary Examiner* — Vivek Srivastava
*Assistant Examiner* — William Goodchild
(74) *Attorney, Agent, or Firm* — Jeffrey S. LaBaw; David H. Judson

(57) ABSTRACT

A method of managing user personal information across a set of service provider sites is implemented, preferably as a web browser plug-in function. As a user navigates to a service provider web site and performs an interaction involving user identity attribute data, the interaction is recorded for later replay. Typically, the interaction is a graphical user interface (GUI) interaction. At a later time, previously-recorded interactions at service provider sites are replayed automatically, i.e., without requiring the user to navigate back to the individual sites and perform the interactions, and (during the replay operation) the user's previously-entered identity attribute data is located and retrieved. A display of the identity attribute data collected from the service provider sites then can be examined, e.g., for any inconsistency among the data. If the user then updates identity attribute data for a given service provider site, the identity attribute data for the site is automatically updated, once again without requiring the user to navigate to the site and re-enter the update directly. The method enables the user to ensure that his or her personal data stored at the service provider sites is up-to-date and synchronized.

20 Claims, 4 Drawing Sheets

600 Report of your identity attribute locations and conflicts 6/30/2006 4 pm

| Identity Attributes | Fidelity netBenefit | Bank of America | Sprint PCS |
|---|---|---|---|
| Address | 2601 Scofield Ridge, Austin, TX, 78727  602 ⚠ | 123 Peachtree St, Atlanta, GA 30332 | 123 Peachtree St, Atlanta, |
| Phone number | 123.456.7890 | 123.456.7890 | 123.456.7890 |
| Email | foobar@ibm.us.com | foobar@ibm.us.com | foobar@gatech.edu |
| SSN | 123-45-6789 | 123-45-6789 | N/A ~602 |

Warnings:
Your address information at Fidelity netBenefits is different from your address at other domains. Click here 📁 to update.
Your email information at SprintPCS is different from your email at other domains. Click here 📁 to update.  604

*FIG. 6*

Current Data: [2601 Scofield Ridge, Austin, TX, 78727]

Updated Data: [              ]   [Update]

*FIG. 7*

MANAGING USER PERSONAL INFORMATION ACROSS WEB SITES

BACKGROUND OF THE INVENTION

1. Technical Field

The present invention relates generally to managing user personal information across a set of service provider sites.

2. Background of the Related Art

As more and more service transactions occur over the Internet, a large amount of end user personal identity information is exposed. Indeed, for each online service, an end user often has to fill out the same personal data, such as address, phone number, social security number and the like, to obtain access. As a result, this information is duplicated in multiple domains and presents increased security risks for the end-user's privacy. Moreover, account information often becomes outdated over time, e.g., if the end user moves, obtains a new credit card number, or only visits a service provider site infrequently. When account information is stale or incorrect, the end-user cannot manage that data effectively, and service providers often end up paying the cost of poor data integrity.

Identity management schemes and technologies are well-known in the prior art. One set of technologies called federated identity managements has a goal of alleviating digital identity management by enabling secured sharing of identity information across Internet domains. For example, IBM Tivoli Federated Identity Manager (TFIM) provides a cross-domain single sign-on (SSO) functionality that allows a user to log-in once at an identity provider; the identity provider then vouches for the user's identity with a set of trusted service providers, thereby allowing the user to access resources at partner web sites. These solutions, while quite effective for their intended purpose, are designed as middleware solutions that rely on and require business-to-business trust relationships.

BRIEF SUMMARY OF THE INVENTION

A client-side application is provided for managing an end user's identity information that the user has shared with different web sites.

In particular, a method of managing user personal information across a set of service provider sites is implemented, preferably as a web browser plug-in function. As a user navigates to a service provider web site and performs an interaction involving user identity attribute data, the interaction is recorded for later replay. Typically, the interaction is a graphical user interface (GUI) interaction. At a later time, previously-recorded interactions at service provider sites are replayed automatically, i.e., without requiring the user to navigate back to the individual sites and perform the interactions, and (during the replay operation) the user's previously-entered identity attribute data is located and retrieved. A display of the identity attribute data collected from the service provider sites then can be examined, e.g., for any inconsistency among the data. If the user then updates identity attribute data for a given service provider site, the identity attribute data for the site is automatically updated, once again without requiring the user to navigate to the site and re-enter the update directly. A report of the identity attribute data located as a result of the replay step may also be provided. The method enables the user to ensure that his or her personal data stored at the service provider sites is up-to-date and synchronized.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 6 illustrates a report generated by the agent illustrating potential conflicts among identity attribute data collected as a result of a replay operation; and FIG. 7 illustrates a display panel through which an end user can update a particular identity attribute.

DETAILED DESCRIPTION OF AN ILLUSTRATIVE EMBODIMENT

The subject matter described herein operates in conjunction within a conventional client-server paradigm in which a client machine (a "client-side") communicates with an Internet-accessible n-tier architecture (a "server-side") executing on a set of one or more machines. End users operate Internet-connectable devices (e.g., desktop computers, notebook computers, Internet-enabled mobile devices, or the like) that are capable of accessing and interacting with the server-side architecture, which architecture typically comprises a web server front-end, together with one or more back-end applications. Typically, each client or server machine is a data processing system comprising hardware and software, and these entities communicate with one another over a network, such as the Internet, an intranet, an extranet, a private network, or any other communications medium or link. As described below, a data processing system typically include one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 1:
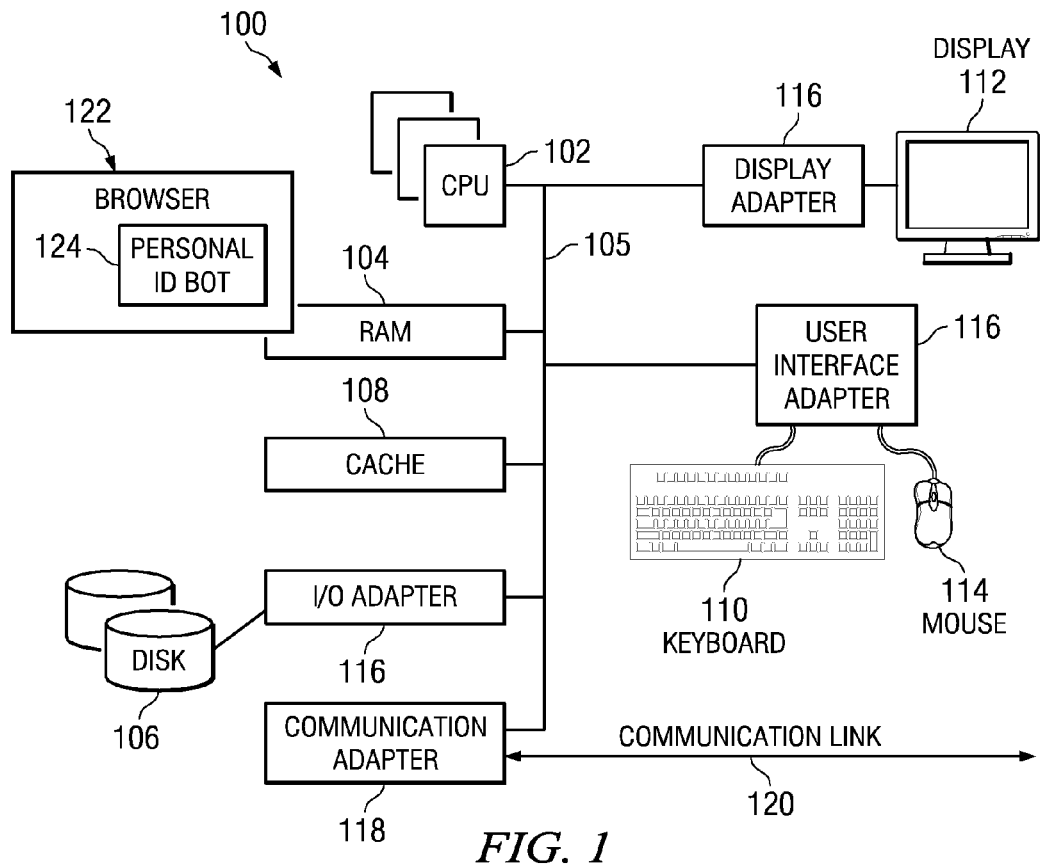
FIG. 1 illustrates a computer system in which the subject matter described herein may be implemented.

As will be seen, the subject matter herein provides for a web browser-based personal identity management method, preferably implemented as a set of processor-executable instructions in a computer. A simplified block diagram of a representative computer system in which the subject matter described herein may be implemented is shown in FIG. 1. The computer system 100 suitable for storing and/or executing program code includes at least one processor 102 coupled directly or indirectly to memory elements through a system bus 105. The memory elements can include local memory 104 employed during actual execution of the program code, bulk storage 106, and cache memories 108 that provide temporary storage of at least some program code to reduce the number of times code must be retrieved from bulk storage during execution. Input/output or I/O devices (including but not limited to keyboards 110, displays 112, pointing devices 114, and the like) can be coupled to the system either directly or through intervening I/O controllers 116. Network adapters 118 may also be coupled to the system to enable the data processing system to become coupled to other data processing systems or devices through intervening private or public networks 120. The data processing system 100 also includes a user agent 122 such as web browser, and a personal identity management agent or "bot" 124 that provides the functionality described herein. More generally, the browser-based personal identity management function is implemented in any convenient manner within, or in association with, a web browser. Thus, without limitation, the personal identity management function may be one of: native browser code (i.e., part of the browser executable), a browser plug-in, a control associated with the browser, code associated with a player, a web page applet, a script, or any other web technologies, such as AJAX (XHTML, XML-based request objects, CSS, DOM accessed with client-side scripting, JSON and the like). This code also may be served to an end user's client machine when the end user accesses an enabled web site, although in the usual case it is persistent on the client machine.

The computer system of FIG. 1 is representative, although the subject matter herein may be implemented in any computing system or device that includes a web browser or graphics rendering engine. As is well-known, an end user accesses a server-side resource in the usual manner, i.e., by opening his or her browser to a Uniform Resource Locator (URL) associated with a host domain. The connection between the client browser and the server-side may be secure, and the browser may connect to the server in any manner over any local area, wide area, wireless, wired, private or other dedicated network. A representative web server is Apache (2.0 or higher) that executes on a commodity machine (e.g., an Intel-based processor running Linux 2.4.x or higher). A data processing system such as shown in FIG. 1 also can be used as to support the server architecture.

Figure 2:
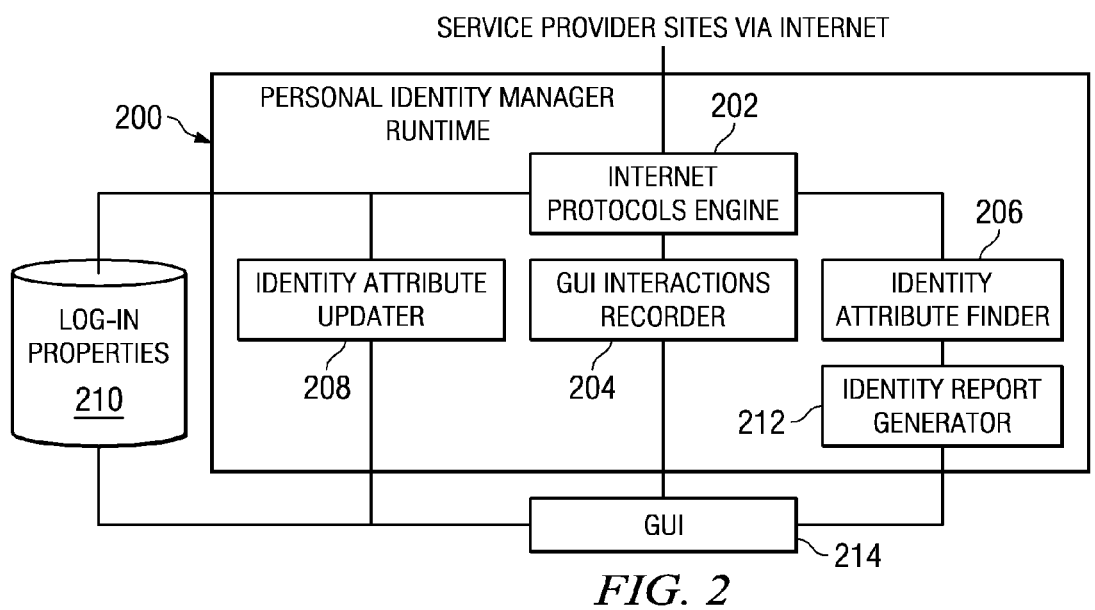
FIG. 2 illustrates a personal identity browser plug-in for use in managing user identity attribute data across service provider web sites according to the technique described herein.
Figures 3, 5:
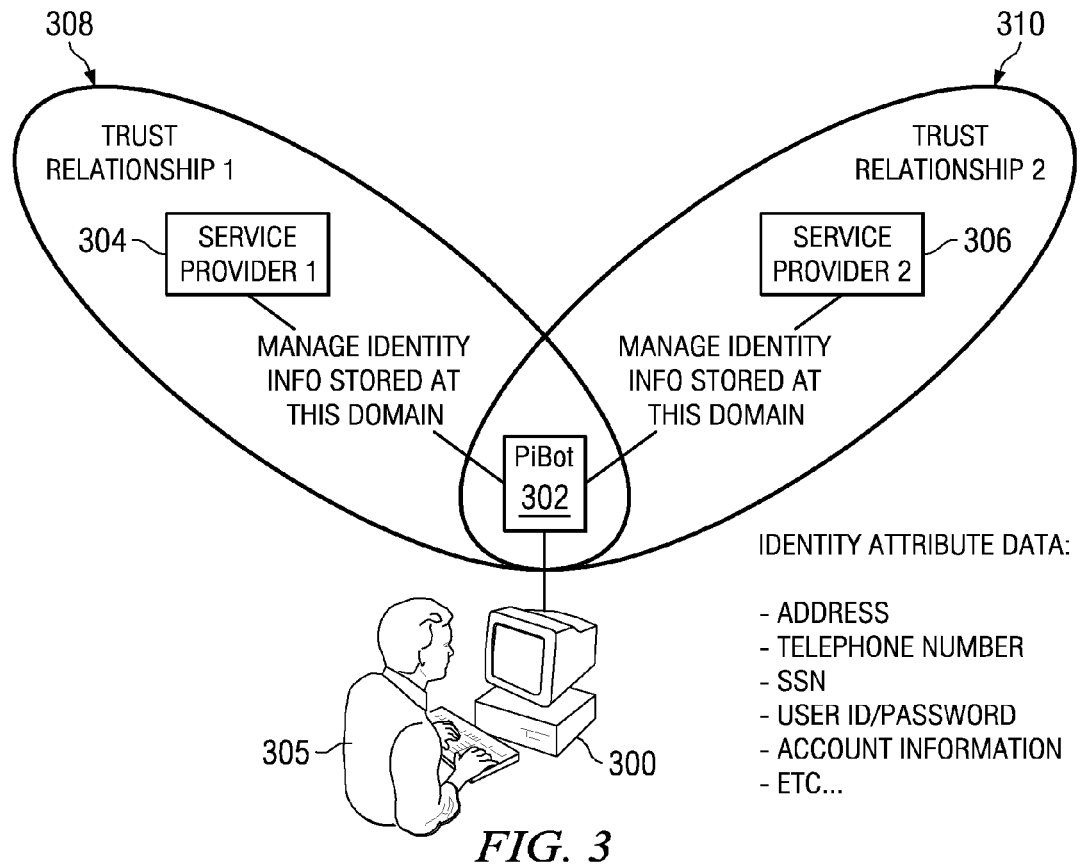
FIG. 3 illustrates how the personal identity browser plug-in enables a user to set up and manage trust relationships with multiple service providers.
FIG. 5 illustrates a management display panel through which an end user provides the agent with log-in information for each site.

Referring now to FIG. 2, a personal identity management agent may be implemented as a set of runtime components 200 that includes Internet Protocol (IP) engine 202, GUI interactions recorder 204, identity attribute finder 206, identity attribute updater 208, and identity report generator 212. Typically, the IP engine 202 is part of an existing web browser runtime and is used to communicate with other web sites. The IP engine thus implements communications and security protocols such as TCP/IP, HTTP and SSL. The GUI interactions recorder 204 records user interface interactions at a web site, such as logging in the site and providing or accessing identity attribute data. In a representative embodiment, the GUI interactions recorder 204 may be implemented by adapting known technologies, such as IBM Rational Functional Tester. The identity attribute finder 206 is a component that is used to play back (or "replay") an interaction previously recorded by the GUI interactions recorder 204. Typically, the replay operation is used to enable the agent to locate a particular identity attribute at a service provider's web site and then to display or otherwise provide the located data to the user. The identity report generator 212 generates an analytical report of identity attributes retrieved from one or more sites by the identity attribute finder 206. The report informs the user of where his/her information is stored on the Internet, and it flags any inconsistencies among duplicated attribute information at different locations. Using the report, the user can then examine the consistency (or lack thereof) of his or her identity attribute data that is stored across multiple service provider web sites. If the user then desires to update such data at a particular site, the identity attribute updater 208 is used. In particular, once the end user provides the update for a site, the identity attribute updater 208 preferably uses the identity attribute finder component 206 to access the site, log-in, locate the information in question, and then make the necessary change, all without the user having to navigate back to the site and re-enter the data directly. To the service provider, there is no difference between actions taken by the identity attribute updater 208 and actions taken directly by the end user. The data store 210 holds log-in information of different service providers that the user has selected. FIG. 5 illustrates a display panel through which such data may be collected. This information typically is used by the identity attribute finder 206 during replay operations to automatically retrieve and update the user's identity data. If sufficient storage exists, the data store 210 may also maintain UI interaction recordings saved by the GUI interactions recorder 204. The browser also includes graphical user interface 214 component to display the site interaction.

Of course, the various runtime components described above need not be implemented as separate components. One or more of the described functions may be combined or otherwise integrated with other browser functionality.

FIG. 3 illustrates end user 305 having a computer 300 on which the personal identity management agent 302 executes. As noted above, in the illustrated embodiment, the agent is a web browser plug-in that has the capability of accessing first and second service provider web sites 304 and 306. In particular, the agent 302 can access service provider web site 304 to manage identity attribute data stored at a domain associated with the site. This creates a first trust relationship 308. Likewise, the agent 302 can access service provider web site 306 to manage identity attribute data stored at a domain associated with this site. This creates a second trust relationship 310. Typically, the first and second service providers have different domains. As illustrated, typically the identity attribute data includes one or more of the following: address data, telephone number, social security number, email address, account information, a user identifier/password and the like. As noted above, often the user's identity attribute data does not remain synchronized across the service provider sites. The personal identity management agent 302 enables the end user to manage that data across the service provider sites using a client-centric approach, which obviates more complex server-side solutions.

Figure 4:
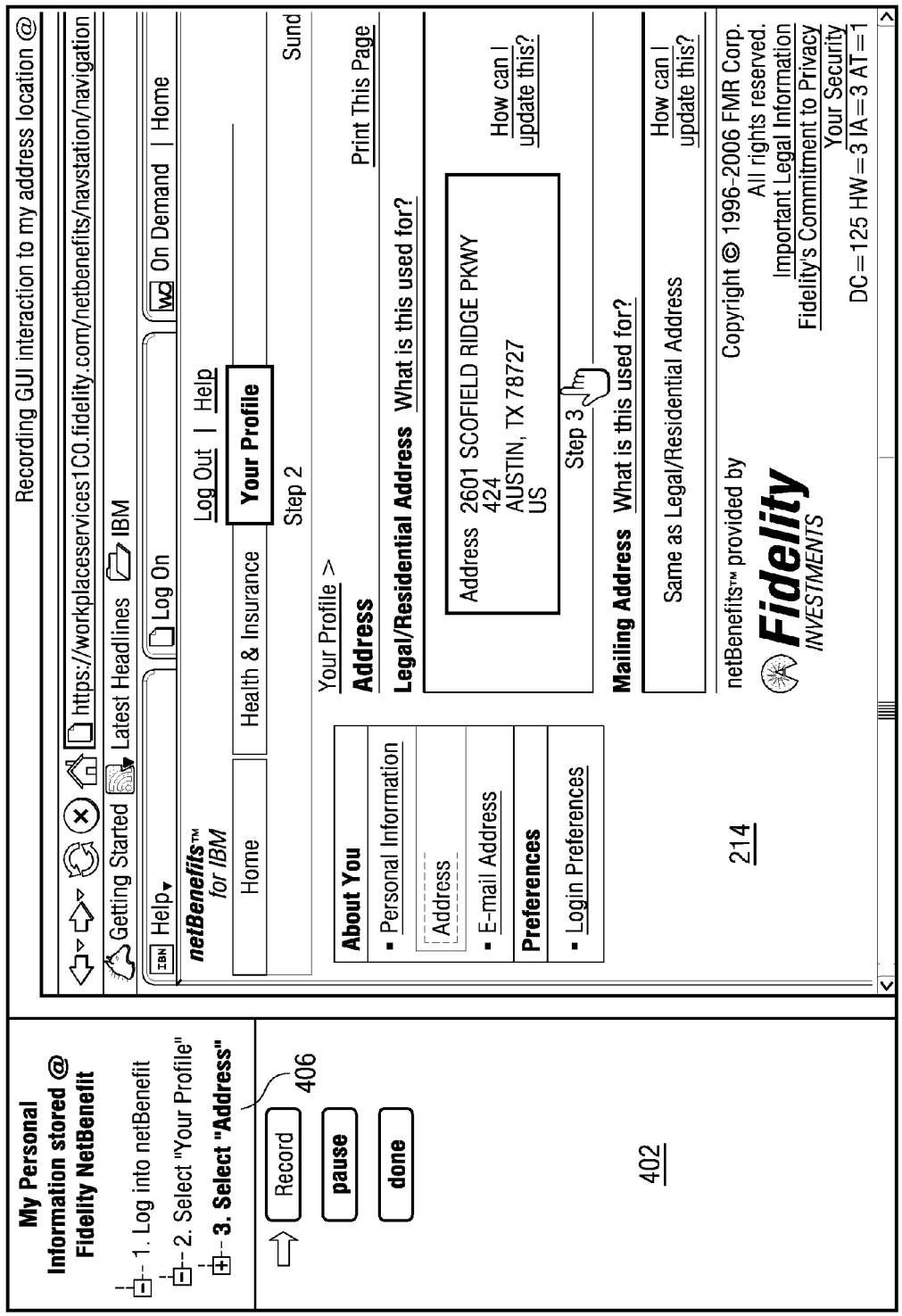
FIG. 4 illustrates the recording of an interaction at a service provider site.

FIG. 4 illustrates the GUI 214 when the user launches the GUI interaction recorder 204 at a particular service provider web site. In this example, the end user has navigated to a profile page on the site, activated the agent and selected to Record the interaction. The GUI interaction recorder displays a navigation panel 402, e.g., on the left portion of the GUI, although this is not a requirement. As the end user performs these operations, the GUI transaction recorder saves the interaction as a data history 406. In one embodiment, the GUI transaction recorder saves the interaction by creating a document object model (DOM) tree for each web page and then saving the tree structure and any associated attribute data input on the page by the end user. Using the controls in the navigation panel 404, the end user can pause the recording or indicate when the recording is completed. The resulting data (the DOM tree structure and the input data) is then exported to the data store 210, preferably as an XML file or the like, and this interaction becomes available for replay by the identity attribute finder as needed. Thus, the end user launches the GUI interaction recorder to save the process of retrieving identity attribute information at a particular service provider web site. These recordings, as noted above, are used by the agent to later retrieve the same information automatically.

To enable the agent (and, in particular, the identity attribute finder) to automatically retrieve identity attribute information, the user typically must first specify authentication information needed to access a service provider's web site. User authentication information (such as user id and password) may or may not be considered "identity attribute data." FIG. 5 illustrates a display interface that can be used for this purpose. This interface 500 includes a list of service providers 502 for which identity attribute data has been saved. By selecting a given service provider, the particular log-in settings are then displayed (in this example, for a Bank of America account). As can be seen, this authentication information may be more than just a user name and password. The display shown in FIG. 5 allows the user to specify what properties are needed to log-in as well as their respective values. This information is then used by the identity attribute finder component during a replay operation at the site. The user can modify the log-in settings, add a new service provider, add a new log-in property for a particular site, and then save any changes.

FIG. 6 illustrates a report 600 that has been generated by the replay of previously-recorded GUI interactions. As can be seen, the report 600 includes a set of identity attributes (address, phone number, email and SSN) that were previously entered by the user at three different sites. According to a preferred embodiment as has been described above, this data was obtained by the attribute identity finder by having that component log into each site (using the authentication information supplied using the interface of FIG. 5) and replaying the previously-recorded GUI interaction saved by the transaction recorder component. The report provides one or more alerts or notifications 602 that enable the end user to take a given action. Thus, for example, here the report indicates to the user that his or her address information at the first site is different from the address at the other domains. The report also prompts the user whether he or she desires to update the address information at the first site. In the illustrated embodiment, this prompt is by way of a folder icon 604 that can be selected by the end user, although any convenient display method may be used for this purpose. The report 600 also indicates that the end user's email information at the third site is different from that at the other domains and provides an update option. In this manner, the end user can view a summary of where his or her identity information are located on the Internet and whether there are any inconsistencies among the duplicated identity attributes at different web sites. In the case of any inconsistency, the user is prompted to use the agent to update the remote identity information (using the agent) without having to log into the web site directly.

In particular, assume that the user desires to correct his or her mailing address for the first site shown in the report 600. By clicking the folder, a display panel such as shown in FIG. 7 is opened. Using this panel, the end user simply enters the corrected information in the form and selects update. This action updates the associated information in the data store 210. As noted above, the identity attribute updater 208 then uses the identity attribute finder component 206 to access the site in question, log-in (using the authentication data as specified using the display of FIG. 4), locate the information in question (using the replay), and then make the necessary change, all without the user having to navigate back to the site and re-enter the data directly.

The replay operation may be carried out periodically (with the results displayed to the user), or upon user demand. Once the user enters an update, which may be an addition of new data, a modification of old data, a deletion of given data, or the like, the agent may perform the update at that time, or one or more updates may be batched and carried out at a later time.

Because site interactions recorded by the GUI interactions recorder typically are not saved (due to storage constraints), the replay operation is used to read the existing identity attribute copies (at the various sites) and populate a report such as shown in FIG. 6. Moreover, for a given site, the agent uses the log-in information (configured via the display panel in FIG. 5) to access and log into the site. If a site interaction has been saved by the agent, however, it may not be necessary to perform the replay operation for the site (unless, for example, it is desired to check that the information there is current). Thus, in an alternate embodiment, it is not required that the replay be carried out to generate the report data, although this is the preferred operation. As noted above, the replay operation preferably is used by the identity attribute updater in response to an update request by the end user. This obviates the end user having to return to the site to enter the update directly.

The subject matter described above provides numerous advantages. The agent provides a simple to configure and use client-side application that manages an end user's identity information that the user has shared with different web sites. The agent preferably is implemented as a browser plug-in and includes automated functionality that informs the end user where and what of his or her personal data exists on the Internet. Using the described agent, the user can query for his or her identity information from a list of configured web sites. The agent helps the user to remember where he or she has shared identity information and whether that information is up-to-date or otherwise consistent. Moreover, the technique of using an automated GUI recording to query for information and/or to provide data updates at a site enables the user to maintain his or her personal identity information consistent across many sites with a minimum of user involvement. In this manner, the end user can easily and efficiently manage account information at multiple service providers and maintain a consistent and synchronized view of such information.

As used herein, the phrase "identity attribute" data or information should be broadly construed to mean any data or information that a user desires to maintain consistent or synchronized across multiple service provider domains.

Although the preferred embodiment implements the agent as a web browser plug-in, this is not required. As long as the personal identity management function has access to the browser engine, this function may reside externally to the client itself.

The inventive approach is lightweight, in that it is implemented entirely on the client-side; thus, the technique can be used with various server-side architectures including simple n-tier architectures, web portals, federated systems, and the like. Because the functionality preferably is implemented on the client-side, the invention may be used in conjunction with any system, device, portal, site, or the like in which any server-side interactions occur. Moreover, while the GUI transaction recorder as described above preferably records client-server GUI interactions (including, without limitation, the display of a page and the forms-based entry of data on that page), the agent may record client-server interactions other than display interactions. More generally, the invention is designed for use in managing information across multiple sites in any operating environment wherein the client (whether an individual or a machine) shares information (including, without limitation, identity attribute data) at each site and there is a goal to maintain consistency of that data across such sites.

Still more generally, the subject matter described herein can take the form of an entirely hardware embodiment, an entirely software embodiment or an embodiment containing both hardware and software elements. In a preferred embodiment, the personal identity management function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Although the subject matter herein has been described herein in the context of an end user client having a web browser, it should be appreciated that other types of devices may act as a "client" with respect to a "server" within a given network or operating environment. Thus, the functionality described herein may be implemented in an intermediary that acts as a client (within a given client-server paradigm).

As used herein, identity attribute data may be generalized as a data string or, more generally, a data structure. In addition, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), or any other reliable transport mechanism (such as IBM® MQSeries® technologies and CORBA, for transport over an enterprise intranet) may be used. Also, the term "web site" or "service provider site" should be broadly construed to cover a web site (a set of linked web pages), a domain at a given web site or server, a trust domain associated with a server or set of servers, or the like. A "service provider domain" may include a web site or a portion of a web site.

Having described our invention, what we now claim is as follows.

The invention claimed is:

1. A method of managing user personal information across a set of service provider sites, comprising:
   recording, by an identity management agent, an interaction with a service provider site involving user identity attribute data;
   at a later time, initiating, by the identity management agent, a replay of previously-recorded interactions to retrieve identity attribute data from at least first and second service provider sites without requiring the user to navigate back to the sites and perform the interactions directly, the identity attribute data being retrieved to enable a determination that the identity attribute data is synchronized across the first and second service provider sites; and
   responsive to receipt of a request to update identity attribute data for a given site as a result of a determination that the identity attribute data is not synchronized, initiating, by the identity management agent, an update of identity attribute data at the given site without requiring the user to navigate to the given site and re-enter the update.

2. The method as described in claim 1 wherein the step of initiating the update of the identity attribute data includes the steps of:
   accessing the given site;
   logging into the given site;
   using information obtained during the recording of an earlier interaction to locate the identity attribute data; and
   updating the identity attribute data.

3. The method as described in claim 2 further including maintaining log-in information for each of the service provider sites for use in performing the logging step.

4. The method as described in claim 1 wherein the interaction is a graphical user interface (GUI) interaction.

5. The method as described in claim 1 wherein the request to update is one of: a request to correct to given identity attribute data, a request to modify given identity attribute data, and a request to delete given identity attribute data.

6. The method as described in claim 1 further including generating a report of the identity attribute data maintained at each of the service provider sites.

7. The method as described in claim 1 wherein the identity attribute data is one of: name, address, telephone, social security number, user identifier, password, and account information.

8. The method as described in claim 1 wherein the step of initiating a replay of an interaction parses a page layout of a web page on the service provider site to locate identity attribute data that was previously-entered by the user on the web page.

9. A computer program product comprising a non-transitory computer readable medium having a computer readable program, wherein the computer readable program when executed on a client performs the following method steps:
   recording an interaction with a first site involving user identity attribute data associated with the first site;
   recording an interaction with a second site involving user identity attribute data associated with the second site;
   at a later time, initiating replay of the recorded interactions to retrieve identity attribute data from the first and second sites without requiring a user to navigate back to the sites and perform the interactions directly, the identity attribute data being retrieved to enable a determination that the identity attribute data is synchronized across the first and second sites; and
   responsive to receipt of a request to update identity attribute data as a result of a determination that the identity attribute data is not synchronized, using a recorded interaction to initiate an automatic update of identity attribute data at one of the first and second sites without requiring the user to navigate back and re-enter the update.

10. The computer program product as described in claim 9 wherein the interaction is a GUI interaction.

11. The computer program product as described in claim 10 wherein the method further includes:
    displaying a record of the identity attribute data retrieved as a result of the replay step.

12. The computer program product as described in claim 9, wherein the computer readable program is downloaded over a network from a remote data processing system.

13. The computer program product as described in claim 9, wherein the computer readable program is stored in a computer readable storage medium in a server data processing system, and wherein the program is downloaded over a network to the client.

14. The computer program product as described in claim 9 wherein the computer readable program is a web browser plug-in.

15. Apparatus, comprising:
    a processor;
    memory; and
    code located in memory and executed by the processor to perform the following method:
       recording a GUI interaction as a user enters identity attribute data at each of a set of service provider domains;
       at a later time, initiating a replay of previously-recorded interactions to retrieve identity attribute data from at least first and second service provider domains, the identity attribute data being retrieved to enable a determination that the identity attribute data is synchronized across the first and second service provider domains;
       displaying the retrieved identity attribute data together with at least one notification and a prompt;
       responsive to the prompt and receipt of an update request for a given domain as a result of a determination that the identity attribute data is not synchronized, initiating an automatic update of identity attribute data at the given domain without requiring the user to navigate to the given domain and re-enter the update.

16. The apparatus as described in claim 15 wherein the step of initiating an automatic update of the identity attribute data includes the following sub-steps:
    accessing the given domain;
    logging into the given domain;
    using information obtained during the recording of an earlier interaction to locate the identity attribute data; and
    updating the identity attribute data.

17. The apparatus as described in claim 16 wherein the method further includes:
    maintaining log-in information for each of the service provider domains for use in performing the logging step.

18. The apparatus as described in claim 16 wherein the update request is one of: a request to correct to given identity attribute data, a request to modify given identity attribute data, and a request to delete given identity attribute data.

19. The apparatus as described in claim 16 wherein the code is implemented as a plug-in to the web browser.

20. The apparatus as described in claim 15 further including a web browser.

* * * * *